UNITED STATES PATENT OFFICE.

GEORGE LAUDER, OF PITTSBURG, PENNSYLVANIA.

BESSEMER PROCESS.

SPECIFICATION forming part of Letters Patent No. 315,150, dated April 7, 1885.

Application filed October 2, 1884. (No specimens.)

*To all whom it may concern:*

Be it known that I, GEORGE LAUDER, of Pittsburg, in the county of Allegheny and State of Pennsylvania, have invented a new and useful Improvement in Bessemer Processes; and I do hereby declare the following to be a full, clear, and exact description thereof.

The object of my improvement is so to conduct the operation as that the charge of metal at the end of the blowing operation shall contain the desired amount of carbon, as distinguished from the ordinary method, whereby the entire charge of pig metal is first completely decarburized, then after the blow is finished the necessary amount of carbon is added to the charge. This I accomplish by charging the converter in the first place with a portion only of the entire charge, and after treating it in the usual way until it is thoroughly decarburized, adding the remainder of the charge, and then turning on the air-blast until the silicon is removed, then stopping the blow at the point where the further decarburization would commence, and finally adding the requisite amount of manganese.

The amount of carbon contained in the pig metal of the charge being previously ascertained, the relative proportion of the first and second charges of pig metal are regulated according to the amount of resulting carbon which the finished product is desired to contain. This will perhaps be best understood if illustrated by an example. If pig metal is used containing three per cent. of carbon and it is desired that the resulting steel shall contain one per cent. of carbon, the converter is first charged with two-thirds of the entire charge of melted metal, and is then turned up, the blast having been previously turned on, and the blowing is continued until the metal in the converter is thoroughly decarburized. The converter is then turned down and the remaining portion (one-third) of the entire charge of melted metal is run in. The converter is then raised and the blast continued until the silicon is removed, and as soon as that is done, and, if possible, before any further decarburization takes place, the converter is turned down. The operation is then complete, excepting that if manganese is to be added, this is then done in the usual way.

The resulting steel will then contain substantially all of the carbon which was present in the second charge of metal, and no more, if the same kind of pig metal is used for both charges, and as the first charge was previously decarburized the amount of carbon in the resulting steel will be in the same proportion to the carbon which is in the pig metal before treatment that the quantity of metal in the second charge bears to the entire charge of metal. Thus, if the entire charge of the converter is intended to be one and a half tons (three thousand pounds) of pig metal containing three per cent. of carbon, and it is desired that the resulting steel should contain one per cent. of carbon, I first introduce into the converter and decarburize therein two thousand pounds of the charge and then add one thousand pounds of melted pig metal having the same percentage of carbon as the first charge. Then the blow is renewed and continued only long enough to desiliconize the metal in the converter. The final blow being arrested before decarburization of the second charge commences, we have in the resulting metal three thousand pounds of metal containing only the carbon of the second charge, the carbon being thus diluted to one per cent. In this example, given merely for the sake of illustration, I have taken no account of the fact that in the second step of the process some of the carbon may be oxidized before all the silicon is removed; nor have I made any allowance for any carbon which may be contained in the final charge of manganese, but practical workers of the Bessemer process will find no difficulty in making such allowances and regulating the relative amounts of the first and second charges of pig metal accordingly, so as to produce a steel containing any desired amount of carbon with a great degree of accuracy, sufficient for all practical purposes.

The amount of carbon contained in the ferromanganese, which is added after the final blow has ceased, will ordinarily make up for any loss of carbon from the second charge, caused by any partial oxidation of the first charge, or partial decarburization after the introduction of the second charge, which may occur by continuing the blows somewhat longer than necessary. If, however, this is found to occur in practice, it may be obviated by somewhat increasing the quantity of the second charge beyond the proportion before indicated, or using for the second charge a pig metal somewhat richer in carbon.

The chief advantage of my improvement will be found in the production of high-carbon steels, because in recarburizing by the ordinary process a considerable amount of silicon is returned to the charge by the admixture of the recarburizing agent, which is added after the metal has been desiliconized by the blow. By my process no recarburizing after the blowing is finished takes places, but the carbon in the latter part of the charge remains in the metal and the silicon is removed by the blowing. Another advantage is that as no recarburizing addition is inserted into the charge after the final blow, the whole process (with the exception of the final addition of ferromanganese, when that is desired) may be conducted with a single kind and quality of pig metal. This secures great uniformity and certainty in the character of the final product.

I am aware that it was proposed by Bessemer to treat a charge of melted pig metal by the pneumatic process until it should be only partially decarburized, so as to leave the desired amount of carbon in the treated metal, and that this process was improved by Mushet by entirely decarburizing the charge and then recarburizing by the addition of a compound of iron, carbon, and manganese. My process, however, differs from both of these and from others of which they are types—from the Bessemer in that the portion of the charge which is not decarburized is separated from the remainder of the charge and is not subjected to the first blow, and from Mushet's improvement in that no recarburizing takes place after the final blow. It is obvious, therefore, that I do not employ the second portion or residual charge as a recarburizer as that term is used and understood in the art.

What I claim as my invention, and desire to secure by Letters Patent, is—

The process herein described of treating pig metal in a pneumatic converter, consisting of first blowing only a certain portion of the entire charge of melted pig to the point of decarburization; second, adding to the decarburized metal in the converter the residue of the charge of melted pig metal; and, lastly, blowing the entire charge until it is desiliconized, but stopping the blow before or as soon as decarburization commences, the quantity of the residual charge bearing the same proportion to the entire charge that the required percentage of carbon in the resulting steel product bears to the percentage of carbon in the pig metal previous to the pneumatic treatment, substantially as described.

In testimony whereof I have hereunto set my hand this 30th day of September, A.D. 1884.

GEORGE LAUDER.

Witnesses:
 JOHN S. KENNEDY,
 JNO. K. SMITH.